United States Patent
Thomas et al.

(10) Patent No.: US 10,561,069 B2
(45) Date of Patent: Feb. 18, 2020

(54) SEGMENTED FAN HOUSING FOR CLEANING SYSTEM OF COMBINE HARVESTER

(71) Applicant: CNH Industrial America LLC, New Holland, PA (US)

(72) Inventors: Jeffrey D. Thomas, Gordonville, PA (US); Karl Linde, Leola, PA (US)

(73) Assignee: CNH Industrial America LLC, New Holland, PA (US)

(*) Notice: Subject to any disclaimer, the term of this patent is extended or adjusted under 35 U.S.C. 154(b) by 121 days.

(21) Appl. No.: 15/726,900

(22) Filed: Oct. 6, 2017

(65) Prior Publication Data

US 2019/0104687 A1    Apr. 11, 2019

(51) Int. Cl.
*A01F 12/44* (2006.01)
*A01D 41/12* (2006.01)

(52) U.S. Cl.
CPC ............ *A01F 12/444* (2013.01); *A01D 41/12* (2013.01)

(58) Field of Classification Search
CPC ........ A01F 12/44; A01F 12/444; A01F 12/30; A01F 12/442; A01D 41/12; A01D 75/282; A01D 41/1276; F04D 29/283; F04D 25/166
See application file for complete search history.

(56) References Cited

U.S. PATENT DOCUMENTS

| | | | | |
|---|---|---|---|---|
| 2,682,951 | A * | 7/1954 | Hamburg | A01D 75/282 137/45 |
| 2,849,118 | A * | 8/1958 | Ashton | A01F 12/444 209/318 |
| 2,954,123 | A * | 9/1960 | Gaunt | A01F 12/444 209/21 |
| 3,049,128 | A * | 8/1962 | Hing | A01F 12/30 460/85 |
| 4,265,077 | A * | 5/1981 | Peters | A01F 12/444 56/14.6 |
| 4,303,079 | A | 12/1981 | Claas et al. | |

(Continued)

FOREIGN PATENT DOCUMENTS

| | | |
|---|---|---|
| BE | 743106 A | 5/1970 |
| DE | 289559 C | 3/1914 |

(Continued)

OTHER PUBLICATIONS

Extended European Search Report for EP Application No. 18198423.8 dated Mar. 11, 2019 (6 pages).

*Primary Examiner* — Arpad Fabian-Kovacs
(74) *Attorney, Agent, or Firm* — Peter K. Zacharias; Patrick M. Sheldrake

(57) ABSTRACT

A fan assembly for a cleaning system of a combine harvester includes a housing having a plurality of interconnected walls. The interconnected walls include at least two side walls and a lower wall connecting the two side walls, and at least one partition positioned between the side walls. The partition promotes uniform air flow across a width dimension of the fan assembly. The interconnected walls define at least one inlet opening through which air is delivered into the housing and at least one outlet opening through which air is exhausted from the housing. A fan rotor is mounted to the housing and is configured to rotate to distribute air from the inlet opening to the outlet opening.

20 Claims, 7 Drawing Sheets

(56) References Cited

U.S. PATENT DOCUMENTS

| | | | | |
|---|---|---|---|---|
| 4,397,319 | A * | 8/1983 | Schuhmacher | B07B 9/00 460/100 |
| 5,165,855 | A * | 11/1992 | Ricketts | F04D 29/283 416/178 |
| 5,599,162 | A * | 2/1997 | Ricketts | A01F 12/444 415/53.1 |
| 6,558,252 | B2 * | 5/2003 | Visagie | A01F 12/444 460/100 |
| 7,416,482 | B2 * | 8/2008 | Weichholdt | A01F 12/444 460/99 |
| 8,221,064 | B2 | 7/2012 | Ricketts et al. | |
| 9,033,779 | B2 * | 5/2015 | Hillen | A01F 12/444 460/99 |
| 9,119,350 | B2 * | 9/2015 | Stan | A01F 12/444 |
| 9,125,346 | B2 | 9/2015 | Schulz | |
| 2005/0013685 | A1 * | 1/2005 | Ricketts | F04D 29/283 415/53.1 |
| 2008/0004090 | A1 * | 1/2008 | Ricketts | A01F 12/444 460/99 |
| 2008/0004091 | A1 * | 1/2008 | Ricketts | A01F 12/444 460/100 |
| 2008/0146299 | A1 * | 6/2008 | Matousek | A01F 12/444 460/100 |
| 2009/0163260 | A1 | 6/2009 | Claes | |
| 2012/0184339 | A1 * | 7/2012 | Schulz | A01D 75/282 460/78 |
| 2018/0007830 | A1 * | 1/2018 | Nelson | B60K 11/06 |

FOREIGN PATENT DOCUMENTS

| | | |
|---|---|---|
| DE | 1077368 B | 3/1960 |
| GB | 860716 | 2/1961 |
| GB | 2051954 A | 1/1981 |
| JP | 2004278473 A | 10/2004 |
| WO | 2008/149233 A2 | 12/2008 |

* cited by examiner

SEGMENTED FAN HOUSING FOR CLEANING SYSTEM OF COMBINE HARVESTER

FIELD OF THE INVENTION

The present invention relates to a fan housing for the cleaning system of agricultural equipment, such as a combine harvester.

BACKGROUND OF THE INVENTION

As is described in U.S. Pat. No. 8,221,064 to CNH America LLC, which is incorporated by reference in its entirety and for all purposes, a cleaning system for a combine harvester includes a fan assembly that is configured to blow air through reciprocating sieves to carry lighter elements of material other than grain (MOG) or chaff away.

Transverse or cross-flow fans of various designs have been advantageously employed with agricultural combines to provide the air that is blown upwardly and rearwardly through the sieves to carry the chaff away from the grain and tailings deposited onto the cleaning system sieves. Transverse fans are useful in combine cleaning systems because such fans can produce a wide stream of air that can be directed upwardly toward the cleaning sieves of the combine cleaning systems but require relatively little space. Such fans, in typical agricultural combines, are disposed such that their air outputs are below the sieves of the cleaning system.

One problem with long and wide transverse fans is that the air blowing through the fan housing will receive air through its inlet in a uniform manner, however, as the air stream passes through the fan housing, the air stream converges towards the center of the housing and creates a significantly stronger airstream in the center of the housing as compared with the sides of the housing. In other words, the air can be unevenly distributed along the width dimension 'W' of the fan (see FIG. 3A) as it travels from the inlet to the outlet of the fan. Moreover, in a situation where the crop mat becomes uneven across the width of the sieves, the air within the fan housing will typically follow the path of least resistance, namely, toward the unobstructed portion of the sieves. This may be referred to in the art as a blowout condition.

It would be desirable to provide uniform distribution of air across the entire width of the fan assembly in order to improve cleaning efficiency, crop processing, and either limit or prevent a blowout condition.

SUMMARY OF THE INVENTION

The disclosure is generally directed to a segmented housing of a fan assembly for a cleaning system of a combine harvester. The housing is segmented by internal partitions to promote uniform air flow across the entire width of the housing.

According to one aspect of the invention, a fan assembly for a cleaning system of a combine harvester includes a housing comprising a plurality of interconnected walls. The interconnected walls include at least two side walls defining an exterior width dimension of the housing, a lower wall connecting the two side walls and at least one partition positioned between the at least two side walls. The interconnected walls define at least one inlet opening through which air is delivered into the housing and at least one outlet opening through which air is exhausted from the housing. The at least one partition forms discrete ducts in the housing through which air flows from the inlet opening to the outlet opening. Each duct extends a portion of a width dimension of the fan assembly to promote a uniform air flow across the width dimension of the fan assembly. A fan rotor is mounted to the housing and is configured to rotate to distribute air from the inlet opening to the outlet opening.

According to another aspect of the invention, the interconnected walls define at least two outlet openings through which air is exhausted from the housing, and the at least one partition includes a first portion positioned at least partially within the inlet opening, a second portion extending within one of the at least two outlet openings, and a third portion extending within the other of the at least two outlet openings.

According to yet another aspect of the invention, the at least one partition includes a pivotable wall proximate to the at least one inlet opening for influencing a flow path of air through the housing.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
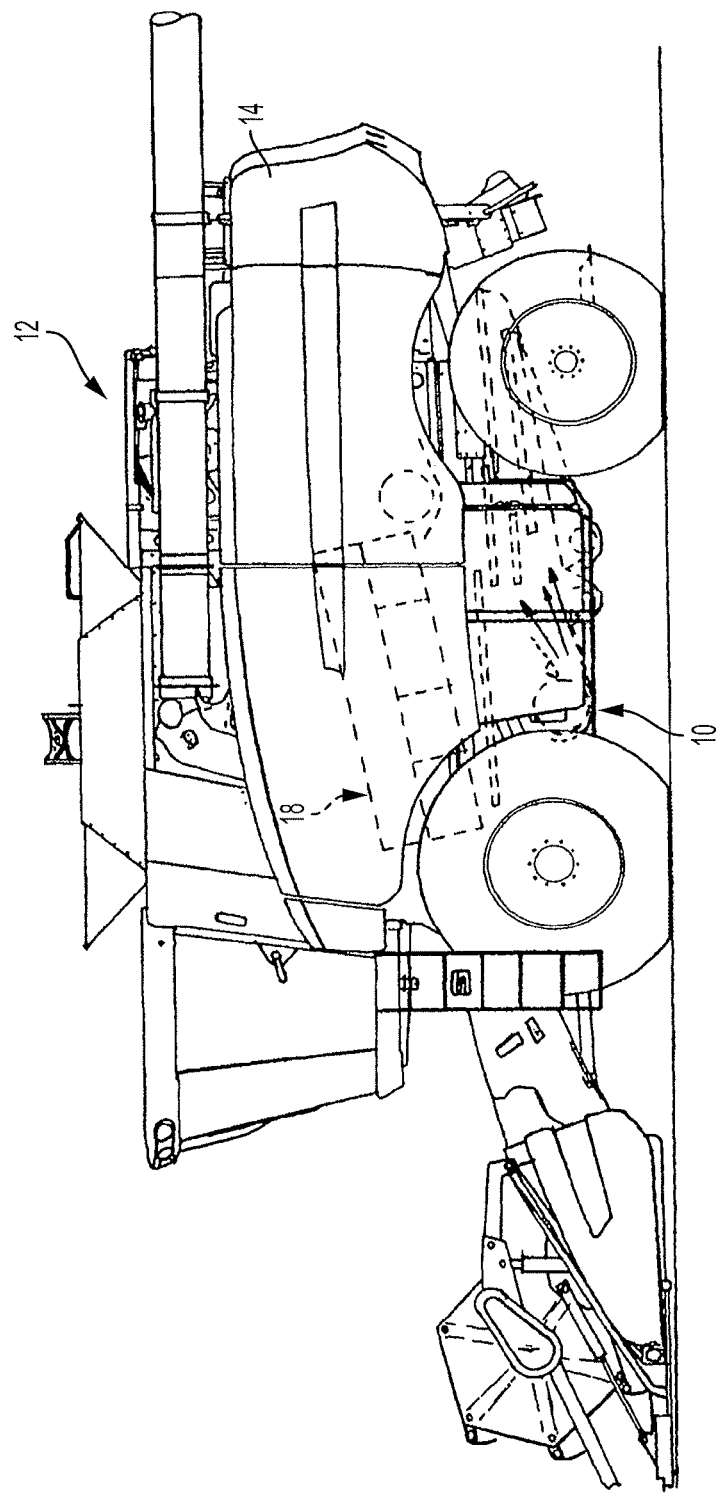
FIG. 1 a left side view of a conventional combine harvester, in which a transverse fan assembly is installed in conjunction with a cleaning system.

Corresponding reference characters indicate corresponding parts throughout the several views. The exemplification set out herein illustrates an embodiment of the invention, in one form, and such exemplification is not to be construed as limiting the scope of the invention in any manner.

It should be appreciated that, while the following discussion will be directed principally to transverse fan assembly embodiments as employed in such a combine harvester, the transverse fan assemblies of the present invention are not limited to use in such harvesters, but could equally as well be employed or utilized in or with other harvesters and equipment, including harvesters that employ dual rotor threshing systems and with equipment for other applications, or with other equipment or in other circumstances and situations, consistent with the principles and teachings expounded.

For convenience of reference and understanding in the following discussions, and with respect to the various drawings and their descriptions, the point of reference for the use of various terms that are hereafter employed, including "left", "right", "forward", "rearward", "front", "back", "top", and "bottom", should generally be considered to be taken from a point at the rear of the machine facing in its normal direction of travel, unless it is clear from the discussion and context that a different point of reference is appropriate. Any use of such terms should therefore be considered exemplary and should not be construed as limiting or introducing limitations.

Moreover, inasmuch as various components and features of harvesters and fan assemblies are of well-known design, construction, and operation to those skilled in the art, the details of such components and their operations will not generally be discussed in significant detail unless considered of pertinence to the present invention or desirable for purposes of better understanding.

Figure 2:
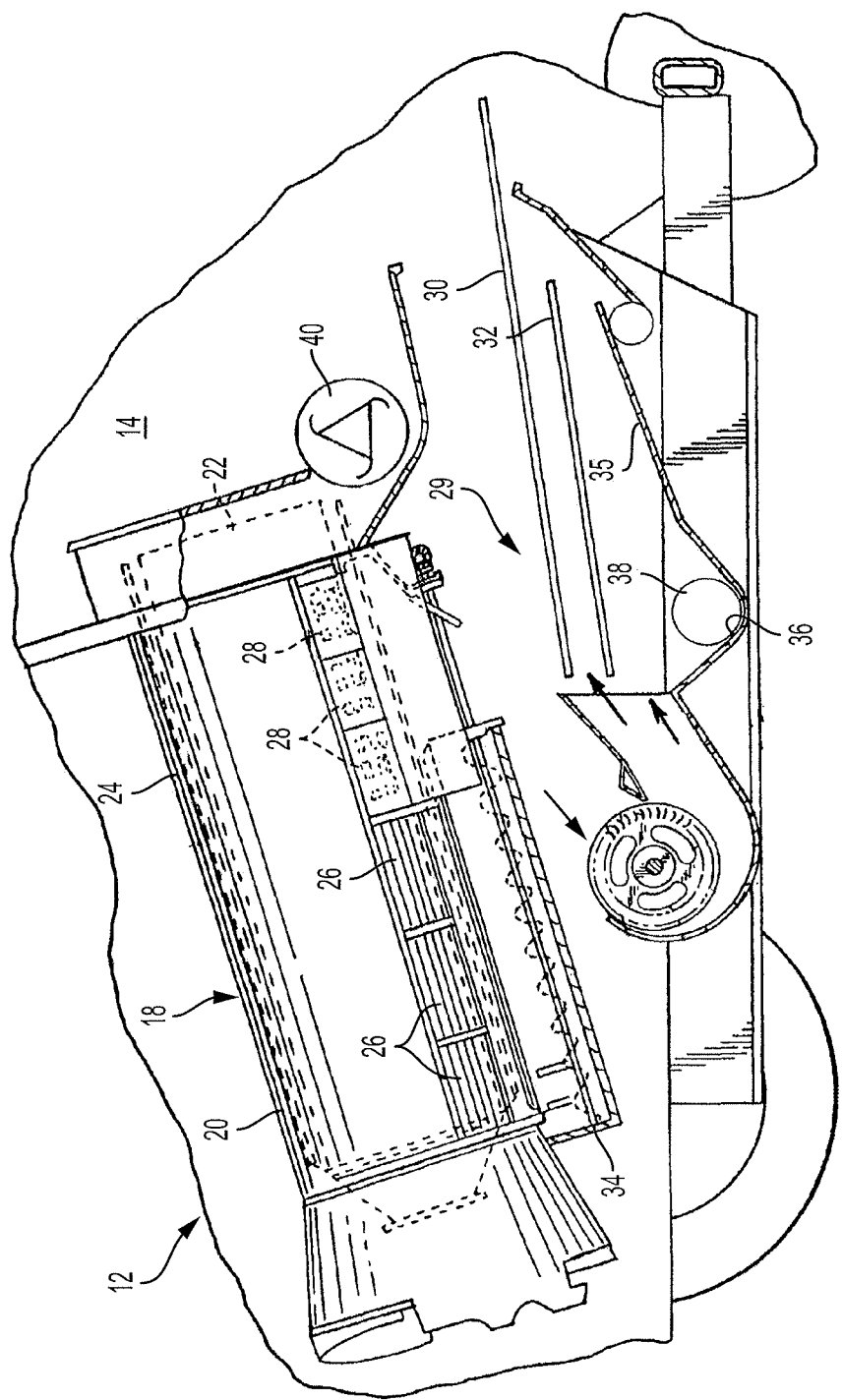
FIG. 2 is a partial cross-sectional view of a portion of the combine harvester of FIG. 1.

FIGS. 1 and 2, which are reproduced from U.S. Pat. No. 8,221,064, identify the general location of and depict a conventional transverse fan assembly 10 arranged in operable combination with a typical, conventional, self-propelled agricultural combine harvester 12 of the axial-flow type wherein crop material is threshed and separated while it is advanced by and along a generally longitudinally arranged rotor.

As is well known in the art, and as is better illustrated in FIG. 2, a threshing apparatus 18 of the combine harvester 12 includes a rotor assembly 20, including a relatively large diameter rotor 22 that is mounted within a threshing cage 24. Disposed about the cage 24 is a system of concaves 26 and separating grates 28 which, through the action of the rotor 22 and centrifugal force, act to separate grain material from other crop residue that is too large to pass through the concaves 26 and grates 28, sometimes hereafter referred to as straw.

The threshed grain material is delivered to a cleaning system 29 that includes a pair of vertically spaced apart cleaning sieves 30 and 32 while the straw is propelled rearwardly through the rotor assembly 20 where a conventional beater 40 acts upon the crop residue discharged from the rotor assembly 20. Beater 40 propels the crop residue from the rear of the rotor assembly 20 and throws it back for broad discharge from the rear end of the combine.

As may be observed from FIG. 2, an auger 34 moves the threshed grain material to the cleaning sieves 30 and 32, which sieves form part of the cleaning system 29 and are mounted for oscillation to separate grain from other larger pieces of threshed crop material. As the sieves 30 and 32 are vibrated or oscillated, the grain falls through the sieves 30 and 32 to an underlying clean grain pan 35 and into a clean grain trough or collector 36. An auger 38 directs the grain from the clean grain trough 36 into a hopper or grain bin (not shown) often housed generally directly behind the cab 12 (FIG. 1) within combine harvester body 14.

The threshed grain material that is too large to fall through the sieves 30 and 32 forms a relatively large crop mat or veil extending across substantially the entire sieve construction, as fan assembly 10 provides air that is blown upwardly and rearwardly, as denoted by the arrows, through sieves 30 and 32. Such air flow acts to blow lighter, non-grain elements, sometimes referred to as chaff, away from the crop mat remaining on the sieves 30 and 32 towards the rear of the harvester, where such chaff is handled in conventional and well-known manners.

As noted above in the Background section, one problem with long and wide transverse fans, such as the fan assembly 10 of the Prior Art, is that the air blowing through the fan housing will converge towards the center of the fan housing and create a significantly stronger airstream in the center of the fan housing as compared with the sides of the fan housing. In other words, the air can be unevenly distributed along the width dimension 'W' of the fan 10 (the width dimension extends into the sheet of paper in FIG. 2).

Figure 3A:
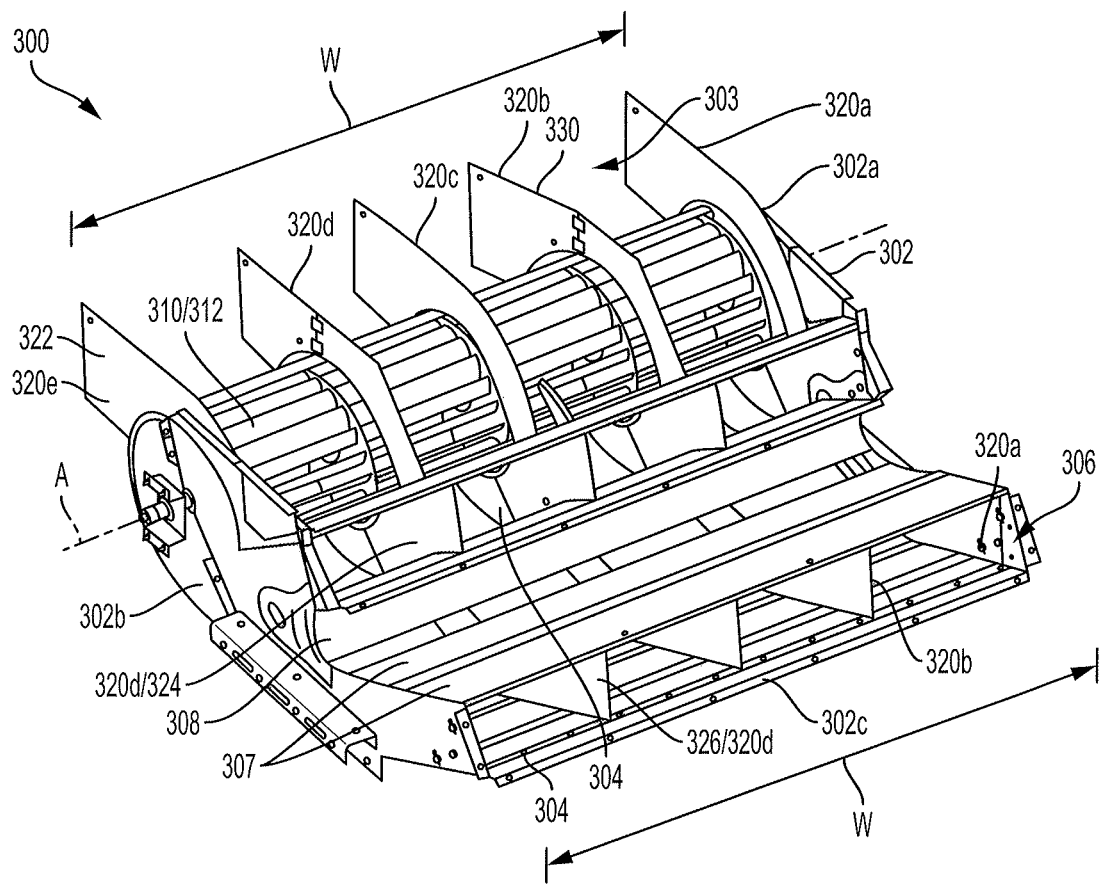
FIG. 3A depicts a rear isometric view of a fan assembly, in accordance with an exemplary embodiment of the present invention.
Figure 3B:
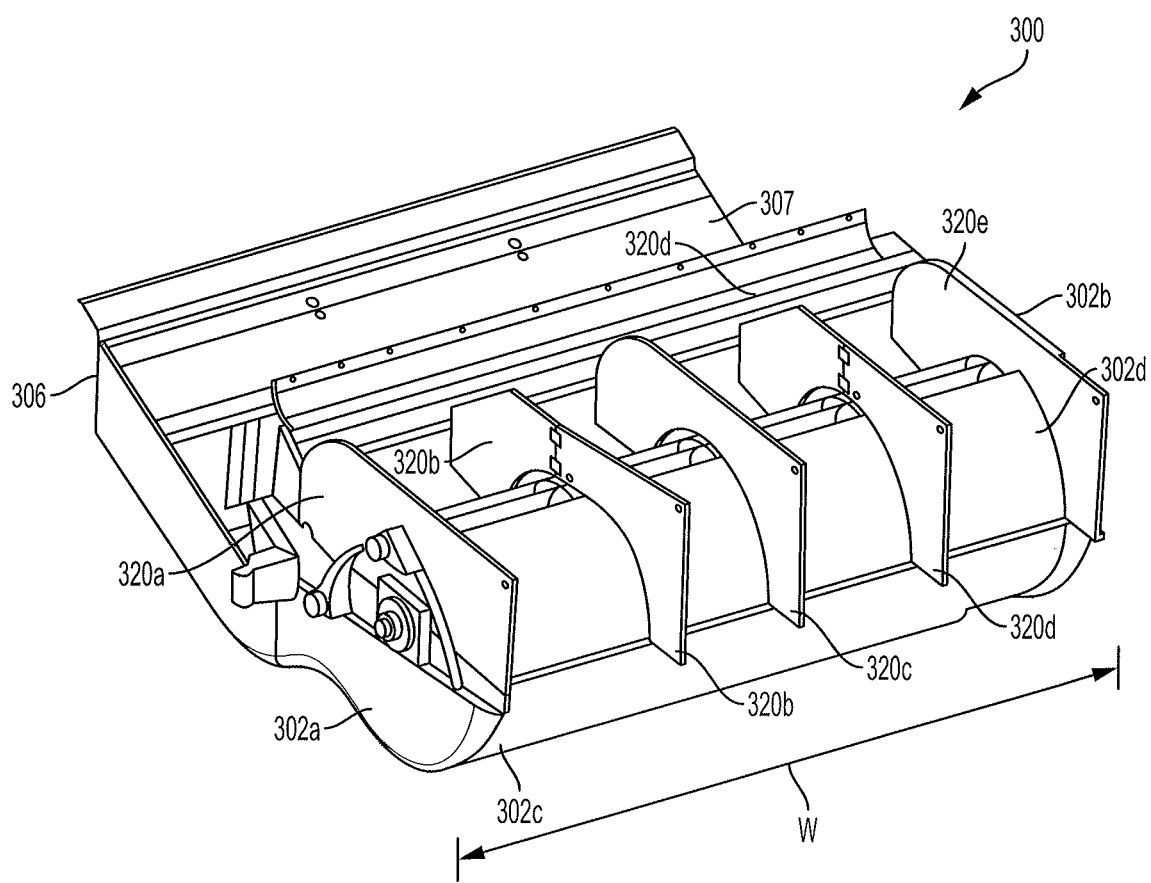
FIG. 3B depicts a front isometric view of the fan assembly of FIG. 3A.
Figure 3C:
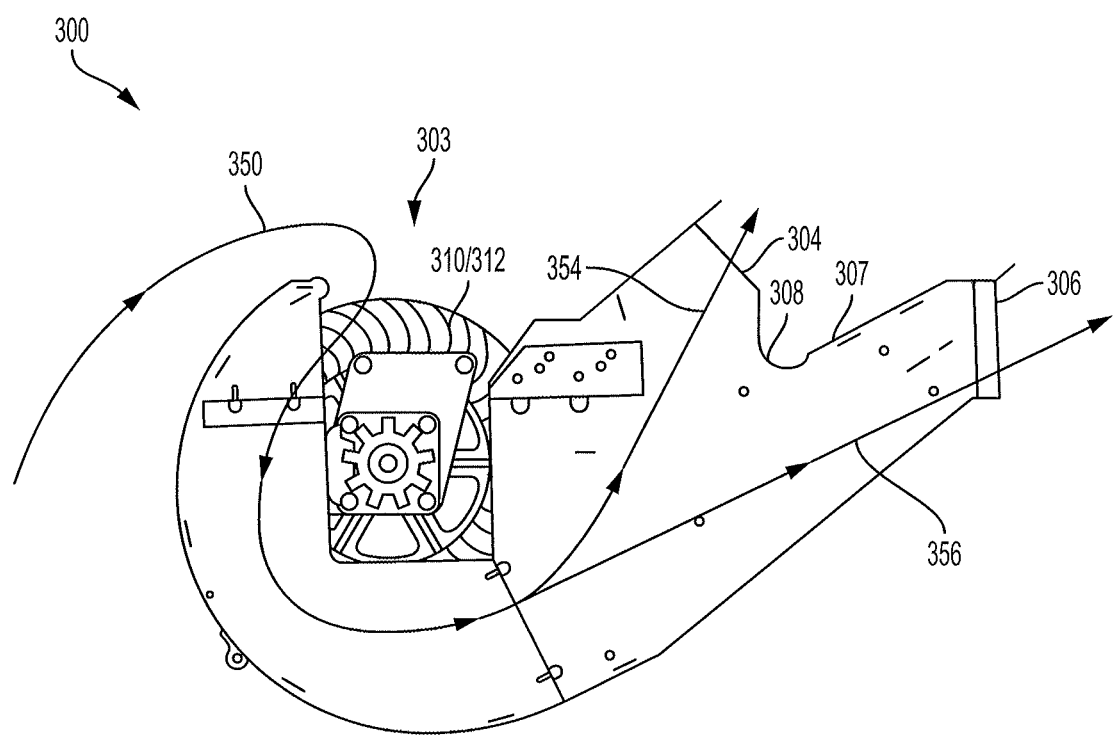
FIG. 3C depicts a side elevation view of the fan assembly of FIG. 3A.

Turning now to FIGS. 3A-3C, there is illustrated a transverse fan assembly 300, in accordance with an exemplary embodiment of the present invention. It is noted that there may be slight structural differences between the fan assemblies 300 shown in FIGS. 3A-3C, and select features of the fan assembly may have been omitted from those figures in order to reveal other features of the exemplary embodiments of the invention described herein.

The fan assembly 300 is intended to replace the fan assembly 10 of FIGS. 1 and 2 in the combine harvester. The fan assembly 300 includes a housing 302 having a series of panels that are mounted together to form an interconnected housing. The housing 302 generally includes two side walls 302a and 302b defining an exterior width dimension, and a bottom cover 302c interconnecting the side walls 302a and 302b. A curved wall 302d extends to the top side of the fan assembly 300. The curved wall 302d is connected to the top end of the bottom cover 302c and is positioned between the side walls 302a and 302b. The individual walls of the housing 302, including the partitions 320, which are described in detail below, may be composed of sheet metal, for example.

The fan assembly 300 includes an air inlet 303 at its top end. Unlike the fan assembly 10 of FIG. 2, the fan assembly 300 includes two exhaust openings 304 and 306 through which air is exhausted. Air flow 350 through the fan assembly 300 is shown in FIG. 3C. In operation, the upper opening 304 directs air 354 onto the upper sieve 30 (see FIG. 2), whereas the lower opening 306 directs air 356 onto the lower sieve 32 of the harvester. One or more panels 307 connect the side walls 302a and 302b to form a top of the lower opening 306. Behind the panels 307 is disposed a curved divider 308 positioned between the exhaust openings 304 and 306. The curved divider 308 serves to separate the air flow 350 into air flow 354 and air flow 356.

The fan assembly 300 includes a single, unitary rotor 310 spanning the entire width W of the fan assembly 300. The rotor 310 includes a series of blades 312 for drawing air through the housing 302 from the inlet 303 to the outlets openings 304 and 306. The rotor 310 may be driven by a single drive.

A series of partitions 320a-320e (referred to either collectively or individually as partition(s) 320) are positioned within the housing 302 for segmenting the housing into discrete ducts in order to promote the uniform passage of air across the entire width W of the fan assembly 300. Each partition 320 generally includes a first portion 322 that is disposed over the rotor 310, a second portion 324 that is at least partially positioned in the upper exhaust opening 304, and a third portion 326 that is at least partially positioned in the lower exhaust opening 306. Each partition 320 (with the exception of pivoted walls 330) is oriented parallel to the side walls 302a and 302b and orthogonal to the axis of rotation A of the rotor 310.

The first portion 322 extends to an elevation above the rotor 310 and includes a cut-out portion for accommodating the rotor 310. The portions 322, 324 and 326 may be integral, or connected together by fasteners or welds. Alternatively, the portions 322, 324 and 326 may be discrete and disconnected. The partitions 320a and 320e at the ends of the housing 302 may, or may not, include the second and third portions 324 and 326.

The first portion 322 of the partitions 320b and 320d each include a rotatable wall 330 defined upstream of the fan rotor 310. The wall 330 is hingedly connected to the remainder of the first portion 322, and is capable of pivoting about a pivot axis to balance the distribution of the air stream across the width W of the housing 302, as necessary. The pivot axis of the wall 330 is oriented orthogonal to the axis 'A' of rotation of the rotor 310. In FIG. 3A, the wall 330 of the partition 320b is shown pivoted, whereas the wall 330 of the partition 320d is not shown pivoted. The wall 330 may be pivoted by hand, or a separate motor (not shown). It should be understood that any one of the partitions 320 might include the wall 330. Alternatively, although not shown, the pivotable walls 330 may be replaced by fixed walls (like partition 320c).

The partitions 320 together define separate ducts 340 through which the air flows from the inlet 303 to the outlets 304 and 306. Separating the air stream into discrete air streams within the ducts 340 promotes even, stable and uniform distribution of the air flow across the entire width W of the fan assembly 300. In the absence of the separate air flow ducts 340, the air flow will converge toward the center of the outlets 304 and 306 under heavy or uneven crop load through the combine.

Figure 4A:
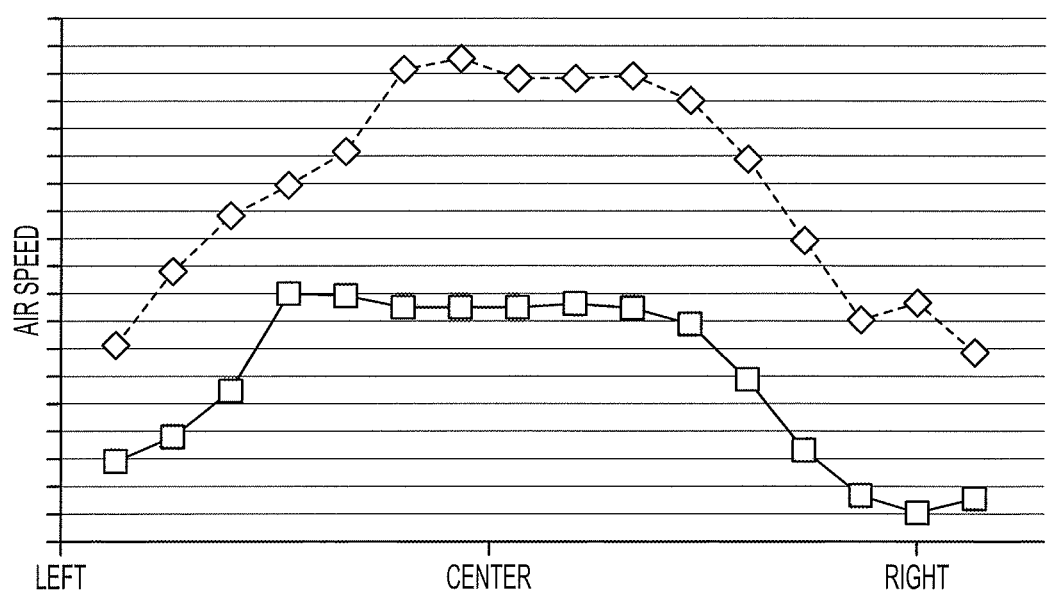
FIG. 4A is a graph showing air speed measurements taken at locations across the outlets of a conventional fan assembly that does not have partitions.

FIG. 4A is a graph showing air speed measurements taken at locations across the outlets of a conventional fan assembly having upper and lower outlet openings that do not have partitions (i.e., unlike the fan depicted in FIG. 3A). As depicted by the graph, the air speed is non-uniform across the width dimension (shown along the X-axis) of the fan assembly. More particularly, the outlet air speed is comparatively low at the left and right ends of the fan assembly with respect to the center of the fan assembly. In other words, the air is concentrated toward the center of the fan assembly. The top line on the graph represents the air speed across an upper opening in the conventional fan assembly, whereas the bottom line on the graph represents the air speed across an lower opening in the conventional fan assembly.

Figure 4B:
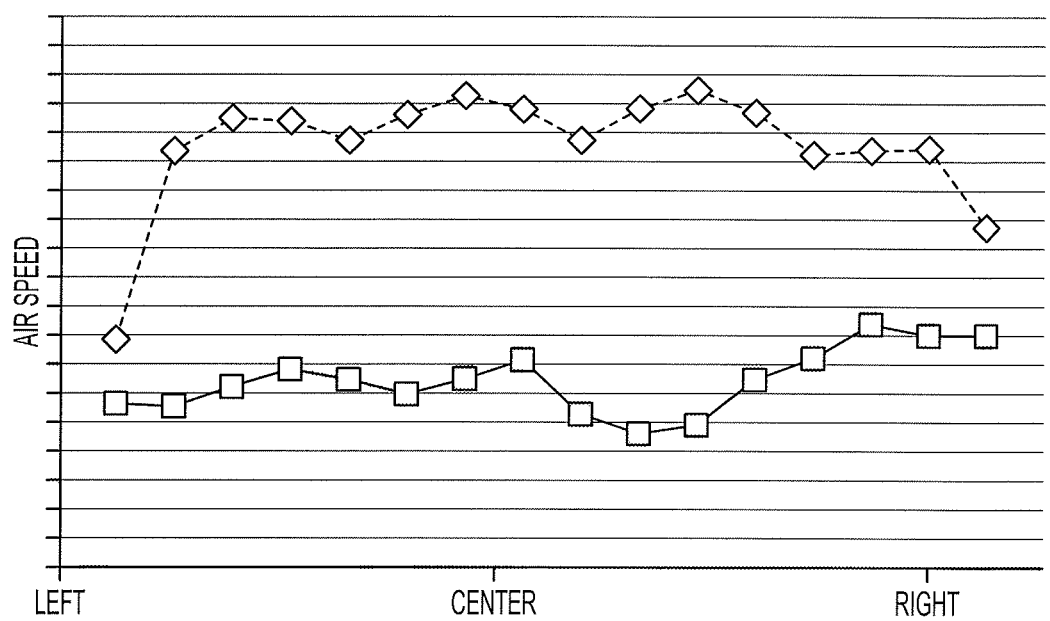
FIG. 4B is a graph showing air speed measurements taken at locations across the outlets of a fan assembly having partitions, such as the fan assembly of FIG. 3A, in accordance with an exemplary embodiment of the present invention.

FIG. 4B is a graph showing air speed measurements taken at locations across the outlets of a fan assembly having partitions, such as the fan assembly 300. As depicted by the graph, the outlet air speed is substantially uniform across the entire width of the fan assembly. The air speed is stable (10-14 meters per second) at the center as well as the right and left ends of the fan assembly. The top line on the graph represents the air speed across the upper opening 304, whereas the bottom line on the graph represents the air speed across the lower opening 306.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fan assembly for a cleaning system of a combine harvester comprising:
  a housing comprising a plurality of interconnected walls, the interconnected walls including:
  at least two side walls together defining an exterior width dimension of the fan assembly;
  a lower wall connecting the two side walls; and
  at least one partition positioned between the at least two side walls; and
  a fan rotor mounted to the housing,
  wherein the interconnected walls define at least one inlet opening through which air is delivered into the housing and at least one outlet opening through which air is exhausted from the housing,
  wherein the at least one partition is at least partially positioned at the inlet opening and forms discrete ducts at the inlet opening of the housing through which air flows from the inlet opening to the outlet opening, each duct extending a portion of the width dimension of the fan assembly to promote a uniform air flow across the width dimension of the fan assembly, and
  wherein the fan rotor is configured to rotate to distribute air from the inlet opening to the outlet opening.

2. The fan assembly of claim 1, wherein the at least one partition is oriented parallel to the at least two side walls.

3. The fan assembly of claim 1, further comprising a plurality of partitions positioned between the at least two side walls.

4. The fan assembly of claim 1, wherein the at least one partition includes a first portion positioned within the inlet opening and a second portion extending within the outlet opening.

5. The fan assembly of claim 4, wherein the portions of the at least one partition are either connected or disconnected.

6. The fan assembly of claim 4, wherein the first portion includes a cutout portion for accommodating the fan rotor.

7. The fan assembly of claim 1, wherein the fan rotor includes a single shaft that extends across the entire width dimension of the fan assembly.

8. The fan assembly of claim 1, wherein the at least one partition includes a pivotable wall proximate to the at least one inlet opening.

9. The fan assembly of claim 8, wherein a pivot axis of the pivotable wall is orthogonal to an axis of rotation of the fan rotor.

10. A fan assembly for a cleaning system of a combine harvester comprising:
  a housing comprising a plurality of interconnected walls, the interconnected walls including:
  at least two side walls together defining an exterior width dimension of the fan assembly;
  a lower wall connecting the two side walls; and
  at least one partition positioned between the at least two side walls; and
  a fan rotor mounted to the housing,
  wherein the interconnected walls define at least one inlet opening through which air is delivered into the housing and at least two outlet openings through which air is exhausted from the housing,
  wherein the at least one partition includes a first portion positioned at least partially within the inlet opening, a second portion extending within one of the at least two outlet openings, and a third portion extending within the other of the at least two outlet openings,
  wherein the at least one partition forms discrete ducts at the inlet opening of the housing through which air flows from the inlet opening to the outlet openings, each duct extending a portion of the width dimension of the fan assembly to promote a uniform air flow across the width dimension of the fan assembly, and wherein the fan rotor in configured to rotate to distribute air from the inlet opening to the outlet openings.

11. The fan assembly of claim 10, further comprising a plurality of partitions positioned between the at least two side walls.

12. The fan assembly of claim 10, wherein the portions of the at least one partition are either connected or disconnected.

13. The fan assembly of claim 10, wherein the first portion includes a cutout for accommodating the fan rotor.

14. The fan assembly of claim 10, wherein the first portion includes a pivotable wall proximate to the at least one inlet opening.

15. A fan assembly for a cleaning system of a combine harvester comprising:
   a housing comprising a plurality of interconnected walls, the interconnected walls including:
   at least two side walls together defining an exterior width dimension of the fan assembly;
   a lower wall connecting the two side walls; and
at least one partition positioned between the at least two side walls; and
   a fan rotor mounted to the housing,
   wherein the interconnected walls define at least one inlet opening through which air is delivered into the housing and at least one outlet opening through which air is exhausted from the housing,
   wherein the at least one partition includes a pivotable wall proximate to the at least one inlet opening,
   wherein the at least one partition forms discrete ducts at the inlet opening of the housing through which air flows from the inlet opening to the outlet opening, each duct extending a portion of the width dimension of the fan assembly to promote a uniform air flow across the width dimension of the fan assembly, and
   wherein the fan rotor is configured to rotate to distribute air from the inlet opening to the outlet opening.

16. The fan assembly of claim 15, wherein the at least one partition is oriented parallel to the at least two side walls.

17. The fan assembly of claim 15, further comprising a plurality of partitions positioned between the at least two side walls.

18. The fan assembly of claim 15, wherein the at least one partition includes a first portion positioned within the inlet opening and a second portion extending within the outlet opening.

19. The fan assembly of claim 18, wherein the pivotable wall is provided on the first portion of the at least one partition.

20. The fan assembly of claim 18, wherein the portions of the at least one partition are either connected or disconnected.

\* \* \* \* \*